United States Patent
Filev

(10) Patent No.: US 8,897,811 B2
(45) Date of Patent: Nov. 25, 2014

(54) SYSTEMS AND METHODS FOR AGGREGATING MISSED CALL DATA AND ADJUSTING TELEPHONE SETTINGS

(75) Inventor: Momchil Filev, Mountain View, CA (US)

(73) Assignee: Google Inc., Mountain View, CA (US)

( * ) Notice: Subject to any disclaimer, the term of this patent is extended or adjusted under 35 U.S.C. 154(b) by 39 days.

(21) Appl. No.: 13/537,996

(22) Filed: Jun. 29, 2012

(65) Prior Publication Data

US 2014/0295805 A1   Oct. 2, 2014

(51) Int. Cl.
*H04W 24/00* (2009.01)
*H04M 3/42* (2006.01)

(52) U.S. Cl.
CPC ................................. *H04M 3/42348* (2013.01)
USPC .................. 455/456.4; 455/456.2; 455/456.3; 455/466; 455/414.1; 370/328; 370/338

(58) Field of Classification Search
CPC .................... G06F 1/3206; G06F 2203/04808; H04W 4/02; H04W 24/08; H04W 60/00; H04W 4/14; H04W 4/20; H04W 88/16; H04W 88/184
USPC ........ 455/421, 423, 404.2, 432.1, 436, 456.1; 370/328–338
See application file for complete search history.

(56) References Cited

U.S. PATENT DOCUMENTS 6,597,906 B1 *   7/2003   Van Leeuwen et al. ... 455/422.1
6,650,896 B1 *   11/2003  Haymes et al. ............... 455/423
7,206,573 B1     4/2007   Weaver et al.
2002/0142792 A1  10/2002  Martinez
2002/0193938 A1 * 12/2002 DeKock et al. ............... 701/117
2003/0008644 A1 *  1/2003  Akhterzzaman et al. ...... 455/418
2003/0046451 A1 *  3/2003  Prabhakaran ...................... 710/1
2004/0203855 A1 * 10/2004  Veerasamy et al. ......... 455/456.1
2006/0014547 A1 *  1/2006  Walter ......................... 455/456.1
2006/0155854 A1 *  7/2006  Selgert ............................ 709/227
2008/0056454 A1 *  3/2008  Lahtiranta et al. ............ 379/67.1
2008/0139196 A1 *  6/2008  Zhang et al. ................... 455/423
2010/0255858 A1 * 10/2010  Juhasz ........................ 455/456.4
2011/0026468 A1 *  2/2011  Conrad et al. ................. 370/329

FOREIGN PATENT DOCUMENTS

EP   2362691 A2   8/2011

OTHER PUBLICATIONS

PCT/US2013/048770 International Search Report and Written Opinion, Mailed Jan. 2, 2014.

* cited by examiner

*Primary Examiner* — Quan M Hua
(74) *Attorney, Agent, or Firm* — Troutman Sanders LLP; James E. Schutz; Jay R. Anderson

(57) ABSTRACT

Certain implementations of the disclosed technology may include systems and methods for aggregating data indicating one or more missed calls and adjusting mobile computing device settings. According to an implementation, a method is provided that includes defining, by a computing device, one or more missed call regions based at least in part on location data associated with one or more missed calls. The method includes receiving a request from a mobile computing device, and sending, to the mobile computing device and in response to the request, an indication of the one or more of the missed call regions. Another implementation can include the method of determining a location of a mobile computing device relative to one or more missed call regions.

20 Claims, 5 Drawing Sheets

SYSTEMS AND METHODS FOR AGGREGATING MISSED CALL DATA AND ADJUSTING TELEPHONE SETTINGS

BACKGROUND

Loud environments can make it difficult to hear a telephone ring, resulting in missed calls. In quiet environments, a user's telephone ringer may inadvertently disturb others. Telephone sound settings on mobile computing devices typically require manual intervention and adjustment by the user. For example, the user typically has to manually set the telephone's ringer settings to silent, vibrate, or loud. Once the ringer has been adjusted, it will typically remain in the last setting until it is manually changed again by the user. Many times a user will forget to turn the telephone to the appropriate setting. For example, a user may forget turn a ringer back on after exiting a movie theater. As a result, the user may not hear the telephone ring and could potentially miss an important telephone call.

SUMMARY

Some or all of the above needs may be addressed by certain implementations of the disclosed technology. Certain implementations may include systems and methods that aggregate data indicating one or more missed calls received at the mobile computing device and adjust a mobile computing device's telephone settings based on a location of the mobile computing device relative to missed call regions.

According to an implementation, a method is provided that includes defining, by a computing device, one or more missed call regions based at least in part on location data associated with one or more missed calls. The method includes receiving a request from a mobile computing device, and sending, to the mobile computing device and in response to the request, an indication of the one or more of the missed call regions.

Another implementation can include the method of determining a location of a mobile computing device relative to one or more missed call regions. The one or more missed call regions are based at least in part on location data associated with one or more missed calls. The method also includes outputting one or more commands when the determined location of the mobile computing device corresponds to at least one of the one or more missed call regions.

According to another implementation, another method is provided. The method includes requesting, by a mobile computing device, missed call region data associated with one or more missed call regions. The method also includes receiving the missed call region data at the mobile computing device. The missed call region data includes location information corresponding to one or more missed call regions. The method includes determining a location of the mobile computing device relative to the one or more missed call regions, and outputting one or more commands when the determined location of the mobile computing device corresponds to at least one of the one or more missed call regions.

According to another implementation, another method is provided. The method includes determining a location of a mobile computing device relative to one or more missed call regions, wherein the one or more missed call regions are based at least in part on location data associated with one or more missed calls. The method also includes outputting one or more commands when the location of the mobile computing device corresponds to at least one of the one or more missed call regions.

According to another implementation, a system is provided. The system includes a server configured to define one or more missed call regions based at least in part on location information associated with one or more missed calls, receive location data from a mobile computing device, and send, to the mobile computing device, an indication of the one or more of the missed call regions. According to another implementation, the system includes a mobile computing device in communication with the server, wherein the mobile computing device includes a location detection system. The mobile computing device is configured to receive the indication of the one or more of the missed call regions, determine, using the location detection system, a location of the mobile computing device relative to one or more missed call regions; and change one or more device settings in response to determining that the location of the mobile computing device corresponds to the one or more missed call regions.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
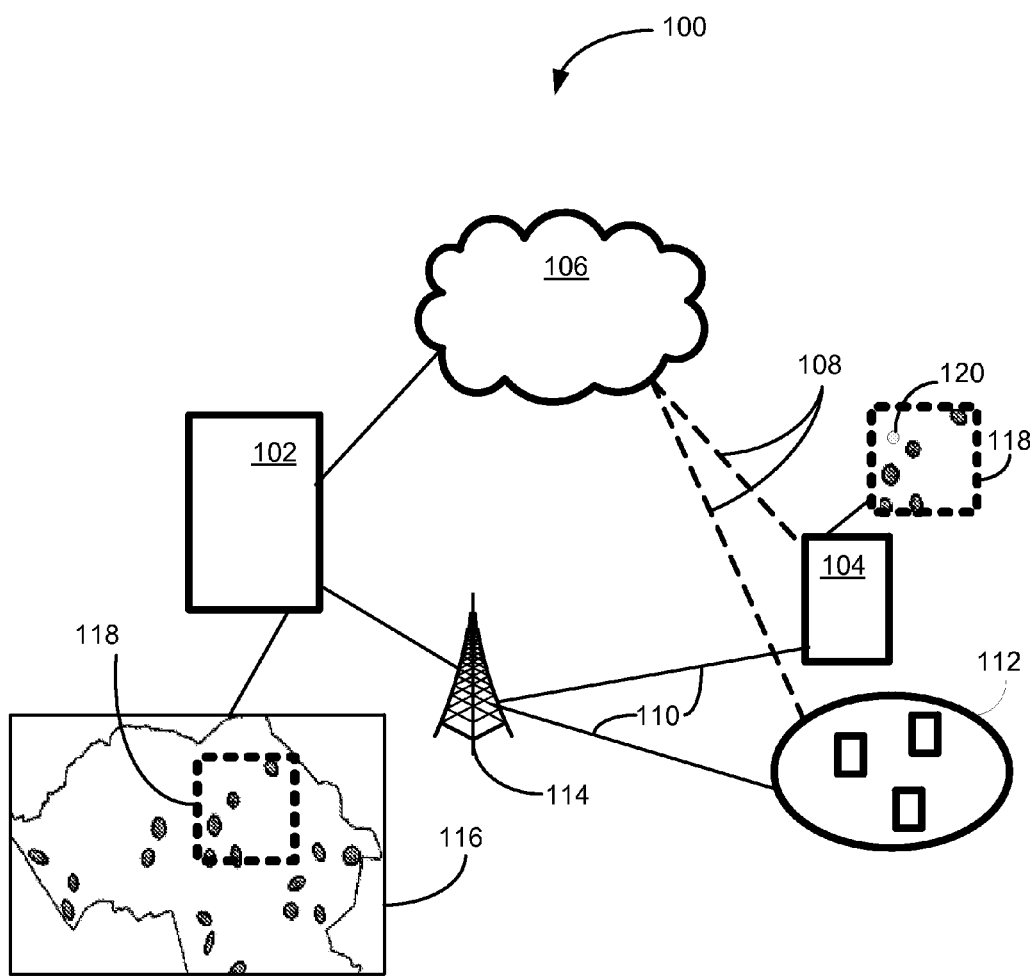
FIG. 1 is a block diagram of an illustrative missed-call aggregation system 100, according to an implementation.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain implementations of the disclosed technology may automatically adjust ringer or other settings on a mobile computing device to, for example, help a user of the mobile computing device to detect incoming calls. Implementations may help the user to avoid missing incoming calls due to inappropriate ringer settings for the user's current environment. In certain implementations, the ringer and/or other mobile computing device settings may be adjusted automatically, based on, for example, data associated with one or more missed (i.e., received but unanswered) calls received at the mobile computing device. In some implementations, such data may be aggregated from other mobile computing devices that have received missed calls in one or more known locations.

Implementations of the disclosed technology may collect and aggregate data indicating one or more missed calls received at the mobile computing device to define missed call regions. In certain implementations, the information from the data indicating one or more missed calls received at the mobile computing device and/or the defined missed call regions may be utilized to dynamically optimize mobile computing device settings. For example the mobile computing device settings that may be dynamically optimized can include, but are not limited to ringer volume, ringer tone, ringer signal frequency, ringer signal frequency variation, pitch, vibration intensity, vibration frequency, visual notifications, screen colors, screen brightness, and application generated alerts including alerts associated with e-mail and SMS messaging. In one implementation, data indicating one or more missed calls received at the mobile computing device may be utilized to define a missed call map for a given user based on specific locations where the user has historically missed calls. In another implementation, data indicating one or more missed calls received at the mobile computing device from a plurality of users may be utilized to define a generalized missed call map. In certain implementations, a database may be populated with historical data indicating one or more missed calls received at the mobile computing device. In one implementation, the database information may be updated as new data indicating one or more missed calls received at the mobile computing device is available. One implementation may assign a weight to the data, for example, based on the age of the data. The generalized missed call map, for example, may be utilized by individual mobile computing device users to instruct a mobile computing device to automatically adjust its telephone ringer settings when the mobile computing device's location is within one or more missed call regions that have been determined to correspond with problematic missed call areas in the generalized missed call map. In another implementation, locations of missed calls may be manually or automatically submitted for creating customized regions for customized ringer settings. Based on this aggregated data, the mobile computing device may adjust its telephone sound settings accordingly in order to help prevent a user from not hearing his/her telephone and missing a call in the future.

According to certain implementations, the disclosed technology may aggregate one or more of the following information: the specific location of the mobile computing device when the missed call occurred, what time the missed call occurred, a current sound setting (e.g., ringer volume level) of the mobile computing device at the time of the missed call, and the user's response after the missed call (for example, whether the user initiated a return call immediately, ignore the missed call, sent a text message, etc.)

According to certain implementations, the disclosed technology may ignore intentionally missed calls for the purpose of optimizing or learning appropriate settings for the mobile computing device. For example, a user may silence the mobile computing device's telephone intentionally to avoid taking a call, or the user may notice later that a call was missed, but choose not to call back. However, if the user had missed an incoming call and immediately returned that call, implementations may determine that the call was not intentionally missed, and thus automatically adjust the sound settings (e.g., a ringer volume) of the mobile computing device to prevent subsequent calls received in the same environment from being missed in the future. In certain implementations, caller information may also be utilized in setting the telephone ringer settings. For example, in certain implementations, if the user has ignored a call from a particular caller more than a predetermined number of times, a ringer volume of the mobile computing device may be automatically set to an appropriate volume and/or setting so that it does not further disturb the user when a subsequent telephone call is received from that particular caller.

The following three examples are presented to provide further clarification and motivation for situations in which the disclosed technology may be utilized:

(1) A user frequents a noisy location (e.g., a bar or a train station) in the evening and often misses calls in this location at this time. Because the user typically returns such calls, the calls are considered to be missed unintentionally. Implementations of the disclosed technology may utilize location information and historical missed call information for the particular user (and/or from other users) to determine that the user is in a missed call region. Implementations of the disclosed technology may adjust the telephone sounds settings (e.g., to loud and vibrate) when the user enters the above-referenced noisy location in the future.

(2) A user visits a quiet location on most Saturday afternoons. Because the user purposely instructs the phone to silence its ringer in response to incoming calls received while at the quiet location, such calls may be considered to be intentionally missed. Implementations may automatically adjust the mobile computing device's telephone sounds settings to less-obtrusive options (e.g., a "silent" setting) when the user enters the same quiet location in the future.

(3) A user finishes her visit to the quiet location (e.g., a library) and exits but forgets to turn her telephone ringer back on. Implementations of the disclosed technology may utilize location information and historical missed call information to determine that users often unintentionally miss calls received shortly after leaving the quiet location. Accordingly, some implementations may automatically turn the telephone ringer back on when the user exits the quiet location.

In accordance with certain implementations, time information may also be utilized to intelligently adjust ringer settings. For example, a given location (e.g., a bar) may present a noisy environment at night, but a relatively quiet one during lunchtime. Therefore, in certain implementations, both the location and time may be utilized to inform automatic adjustment of a mobile computing device's the ringer or other settings.

In accordance with certain implementations of the disclosed technology, users may "opt-in" by explicitly indicating or authorizing the mobile computing device to utilize a microphone on the mobile computing device to aid in determining when local noise may interfere with the user's ability to detect an incoming call. In an implementation, the microphone-detected noise may be utilized to automatically adjust the ringer or other settings on the mobile computing device.

According to certain implementations of the disclosed technology, various techniques may be utilized for tracking or determining the location of a mobile computing device, including but not limited to cell tower triangulation, global position systems, and Wi-Fi hot spots. In accordance with certain implementations of the disclosed technology, users may opt-in by explicitly indicating or authorizing the location detection and/or tracking feature of the mobile computing device. Furthermore, users may opt-in by explicitly indicating or authorizing communication of the detected location information to a server for aggregation of missed call and location data. Users may also opt-in by explicitly indicating or authorizing communication of the detected location information to a server for communicating location data to the server for receiving location-specific information such as localized missed-call region maps or alerts based on the current location of the mobile computing device.

Various systems and techniques may be utilized for adjusting a mobile computing device's settings based on the location of the mobile computing device, according to implementations of the disclosed technology, and will now be described with reference to the accompanying figures.

FIG. 1 is a block diagram of an illustrative missed-call aggregation system 100, according to an implementation. In an implementation, a server 102 may be in communication with a mobile computing device 104. The mobile computing device could be a smartphone, tablet computing device, personal digital assistant (PDA), smart watch, laptop computer, or other portable computing device. In one implementation, the communication between the server 102 and the mobile computing device 104 may be via the Internet 106 and a data connection 108. In some implementations, the data connection 108 may be any of a Wi-Fi, cellular data network, cellular telephone network, LAN, WAN, or other connection. In another implementation, the communication between the server 102 and the mobile computing device 104 may be via a cellular radio channel 110 and through a service provider 114.

In accordance with similar implementations, the server 102 may also be in communication with a plurality of mobile computing devices 112. The mobile computing devices 112 may include smartphones, tablet computing devices, PDA's, smart watches, etc. In one implementation, the communication between the server 102 and the plurality of mobile computing devices 112 may be via the data connection 108 and through the Internet 106. In another implementation, the communication between the server 102 and the plurality of mobile computing devices 112 may be via a cellular radio channel 110 and through a service provider 114.

In an implementation, the plurality of mobile computing devices 112 may provide data indicating one or more missed calls received at the mobile computing device to the server 102. For example, the data indicating one or more missed calls received at the mobile computing device can include information related to the location of one or more missed calls. In certain implementations, the data indicating one or more missed calls received at the mobile computing device can also include information including, but not limited to, the mobile computing device's ringer settings, subsequent actions by the user, time of day, and/or other contextual information.

According to implementations, aggregating the data indicating one or more missed calls received at the mobile computing device from multiple users via the plurality of mobile computing devices 112 may provide information for generating a database or map 116 of missed call regions. According to one implementation, a missed call region may be defined as an area where the ratio of missed calls to successfully answered calls is above a certain value. In one implementation, a region may be tagged as a missed call region if the ratio of missed calls to successfully answered calls is above an average per unit area value. In one implementation, a missed call region may be defined as area that has more than twice the average ratio of missed calls to successfully answered calls per unit area. Other ratios may be utilized to define the boundary of a missed call region, according to implementations, without departing from the disclosed technology. In accordance with implementations, one or more boundaries may be set around missed call regions to provide various zones that may be utilized for warning the user that they are approaching a missed call region. For example, in one implementation, missed calls may be the result of no service in certain areas and such a boundary zone around the no-service area may be utilized to allow warning messages to be sent to the mobile computing device before service drops off completely.

According to implementations, data indicating one or more missed calls received at the mobile computing device may be communicated to the server automatically by a mobile computing device 104 and/or by a plurality of mobile computing devices 112. In certain implementations, the users of the mobile computing devices may opt-in to provide such information, which may be utilized to help the rest of the users within the network. According to another implementation, a particular user may manually provide data indicating one or more missed calls received at the mobile computing device to the server 102, for example, via a web interface. In one implementation, the user may input GPS or other coordinate information for problematic spots. For example, a user may experience missed calls whenever they are in a certain part of their house, and location/elevation information for this area may be saved locally and/or sent to the server 102.

In accordance with certain implementations of the disclosed technology, one or more missed call regions may be determined based at least in part on the data indicating one or more missed calls received at the mobile computing device, and a representative map 116 or database may be stored at the server 102. In certain implementations, the server 102 may receive a request from a mobile computing device 104 for missed call region data and the server 102 may send at least a portion 118 of missed call region data to the requesting mobile computing device 104. According to certain implementations, a portion 118 of the map 116 or database may be selected and sent to the mobile computing device 104 based on the location of the mobile computing device 104, for example, so that the entire database or map 116 doesn't need to be sent, but rather, only the local missed call information near the location 120 of the mobile computing device 104.

According to certain implementations of the disclosed technology, the determination of whether or not the mobile computing device 104 is in a missed call region may be accomplished by comparing the location 120 of the mobile computing device with missed call region data. In one implementation, the comparison may be done at the server 102. For example, the mobile computing device 104 may periodically send location 120 information to the server 102, and when the server determines that the mobile computing device 104 is in or near a missed call region, it may send a message or instructions to the mobile computing device 104 to adjust the ringer settings appropriately. In this implementation, the bulk of the work may be done at the server 102.

In another implementation, rather than sending location 120 information to the server 102, the mobile computing device 104 may periodically or intelligently request and receive a local portion 118 of the data indicating one or more missed calls received at the mobile computing device 116 from the server 102. In this implementation, the mobile computing device 104 may utilize its location system (GPS or otherwise) to determine if its location 120 corresponds to a missed call region on the local portion 118 of the missed call map, and the determination may all be done at the mobile computing device 104 to alleviate having to send location information to the server 102. According to an implementation, if it is determined that the location 120 of the mobile computing device 104 is in or near a missed call region, it may display a message and/or adjust the ringer settings appropriately.

In accordance with implementations, the location of the mobile computing device 120 relative to the one or more missed call regions may be utilized to determine if the mobile computing device 104 has entered a missed call region and/or if it has exited a missed call region. Such information may be useful in situations where the user enters a missed call region and the ringer settings are automatically adjusted for that particular region. When the user leaves the missed call region, the location data may be utilized to restore the ringer to default settings.

In accordance with certain implementations, the mobile computing device 104 may request ringer setting instructions from the server 102. In other implementations, the ringer setting instructions may be stored and retrieved locally from memory on the mobile computing device 104. In accordance with certain implementations, the ringer instructions may be determined from the data indicating one or more missed calls received at the mobile computing device. In one implementation, different missed call regions may have different associated ringer instructions. For example, a location corresponding to a noisy bar may have associated instructions that set the ringer to maximum loudness, while a location corresponding to a church or library may have associated instructions that silence the ringer. In certain implementations, ringer instructions can include instructions to adjust volume, adjust vibration settings, send a visual notification to a screen, and/or automatically send a text message upon receipt of a call.

According to implementations of the disclosed technology, the missed call regions can include those areas with service dead spots. For example, a cellular service provider 114 may have inadequate cellular coverage in certain areas, such as those rural areas with low population density. Mobile computing devices 104 in these areas may miss calls because of the lack of service. In one implementation, the mobile computing device 104 may present a visual or audible message or alert to the user when the current location of the device corresponds to a location adjacent to a service dead spot. In one implementation, the mobile computing device 104 may receive the alert from the server 102. In another implementation, the mobile computing device 104 may generate and present the alert locally based on internal comparison of the mobile computing device location 120 with respect to local missed call map 118. For example, the alert may warn the user that they are about to enter (or have already entered) a region with no service or limited service.

Various implementations in accordance with the disclosed technology may provide automatic ringer settings for a mobile computing device 104. In one implementation, incoming telephone calls may be tracked on the mobile computing device 104, and information related to the call may be utilized to build data indicating one or more missed calls received at the mobile computing device. For example, information including the location and time of the call, and any subsequent actions may be tracked and utilized in the data indicating one or more missed calls received at the mobile computing device. In another implementation, information related to successful calls and missed calls may be logged by mobile computing devices 112 and periodically sent to the server 102.

According to an implementation, when the mobile computing device 104 is in a missed-call region, a text message may be automatically sent to the caller. For example, the message may indicate that "Joe is in a loud environment and may not be able to hear the ringer."

Figure 2:
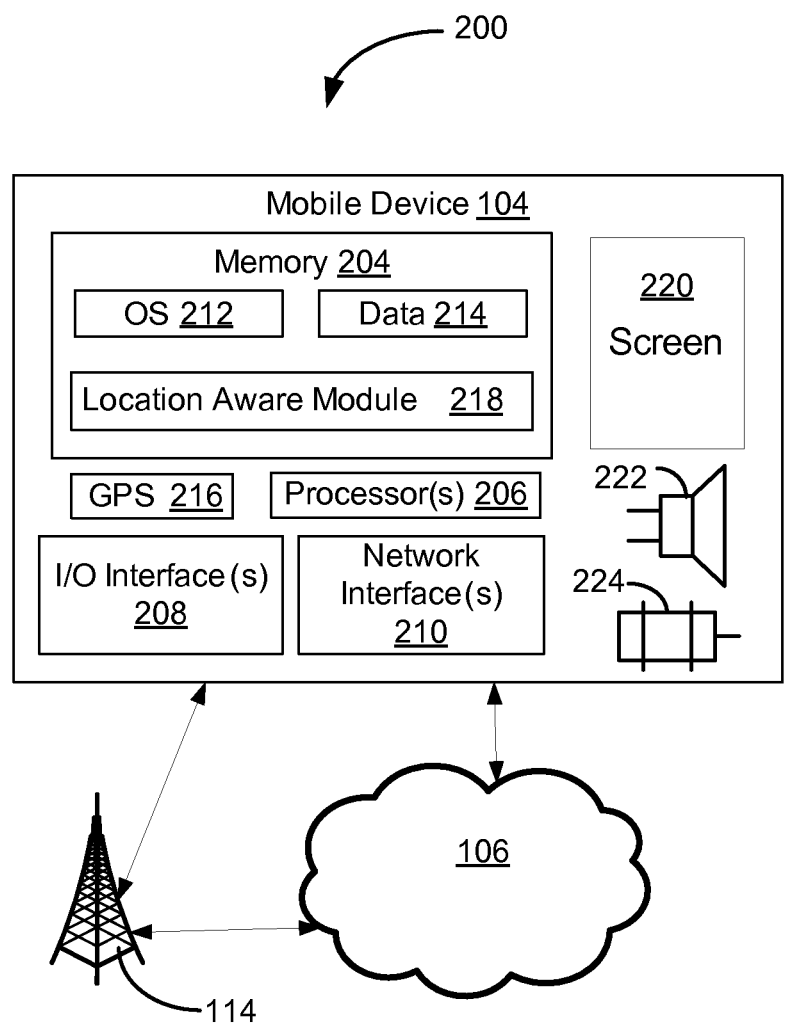
FIG. 2 is a block diagram of an illustrative mobile communications system 200, according to an implementation.

FIG. 2 is a block diagram of an illustrative mobile communications system 200, according to an implementation. The system 200 includes a mobile computing device 104, such as a cellular telephone, smart phone, tablet, etc. The mobile computing device 104 may be in communication with server via a service provider 114 directly or via a web or Internet connection 106. In various implementations, the mobile computing device 104 includes a memory 204, one or more processors 206, one or more input/output interfaces 208, and one or more network interfaces 210. According to an implementation, the memory 204 may include an operating system 212, data 214, and one or more location aware modules 218. In one implementation, the mobile computing device 104 may include a global positioning system (GPS) 216 to determine position information that may be utilized by the location aware module 218. In an implementation, the location aware module 218 may be utilized compare information from the GPS 216 with missed call information. In an implementation, depending on the proximity of the mobile computing device 104 to a missed call area, the location aware module 218 may send messages to the screen 220, send signals to a ringer speaker 222, and/or send a signal to a vibrator element 224 to alert the user.

Figure 3:
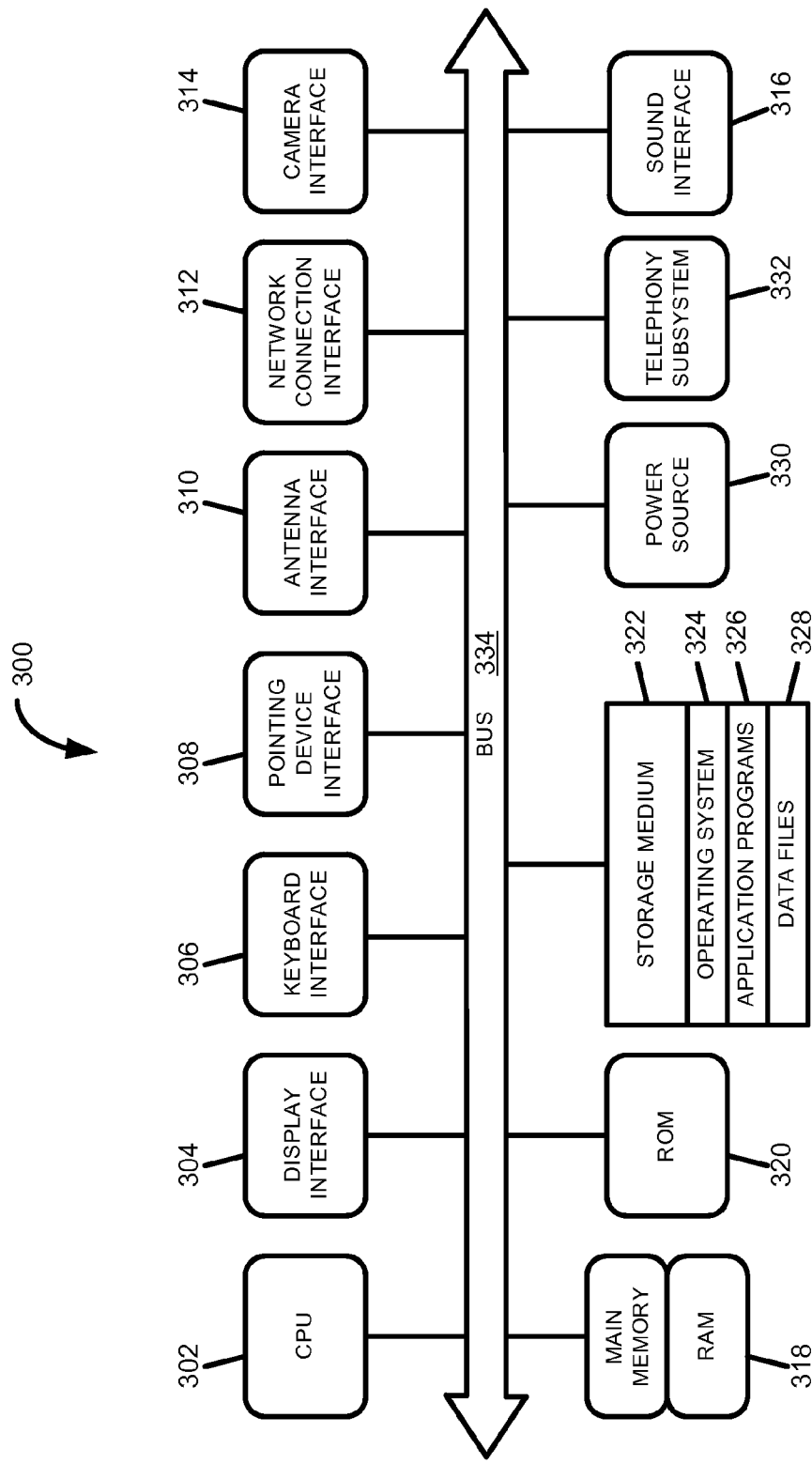
FIG. 3 is a block diagram of an illustrative server architecture 300, according to an implementation.

FIG. 3 illustrates a block diagram of architecture 300 for a server (such as server 102 shown in FIG. 1). Various implementations of the communication systems and methods herein may be embodied in non-transitory computer readable media for execution by a processor. It will be understood that the architecture 300 illustrated in FIG. 3 is provided for example purposes only and does not limit the scope of the various implementations of the communication systems and methods. Certain aspects of FIG. 3 may also be embodied in the mobile computing device (for example, the mobile computing device 104 as shown in FIGS. 1 and 2.

The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or touch screen. Implementations of the architecture 300 may include an antenna interface 310 that provides a communication interface to an antenna; a network connection interface 312 that provides a communication interface to a network. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to implementations, a random access memory (RAM) 318 is provided, where computer instructions and data are stored in a volatile memory device for processing by the CPU 302.

According to an implementation, the architecture 300 includes a read-only memory (ROM) 320 where invariant low-level systems code or data for basic system functions such as basic input and output (I/O), startup, or reception of keystrokes from a keyboard are stored in a non-volatile memory device. According to an implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an implementation, the architecture 300 includes a power source 330 that provides an appropriate alternating current (AC) or direct current (DC) to power components. According to an implementation, the architecture 300 includes and a telephony subsystem 332 that allows the device 300 to transmit and receive sound over a telephone network. The constituent devices and the CPU 302 communicate with each other over a bus 334.

In accordance with implementations, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
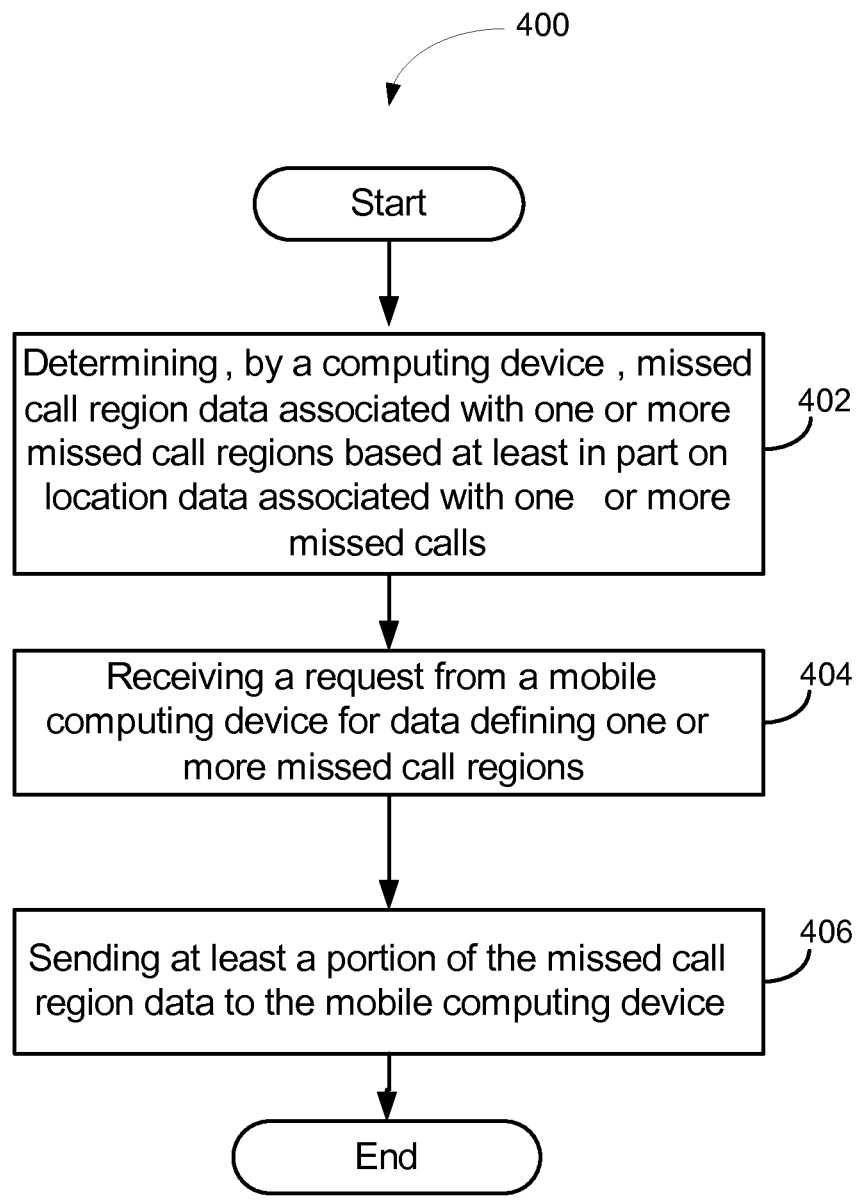
FIG. 4 is flow diagram of a method according to an implementation.

FIG. 4 is flow diagram of a method 400 according to an implementation. The method 400 starts in block 402, and according to an implementation includes determining, by a computing device, missed call region data associated with one or more missed call regions based at least in part on location data associated with one or more missed calls. In block 404, the method 400 includes receiving a request from a mobile computing device for data defining one or more missed call regions. In block 406, the method 400 includes sending at least a portion of the missed call region data to the mobile computing device. The method 400 ends after block 406.

Figure 5:
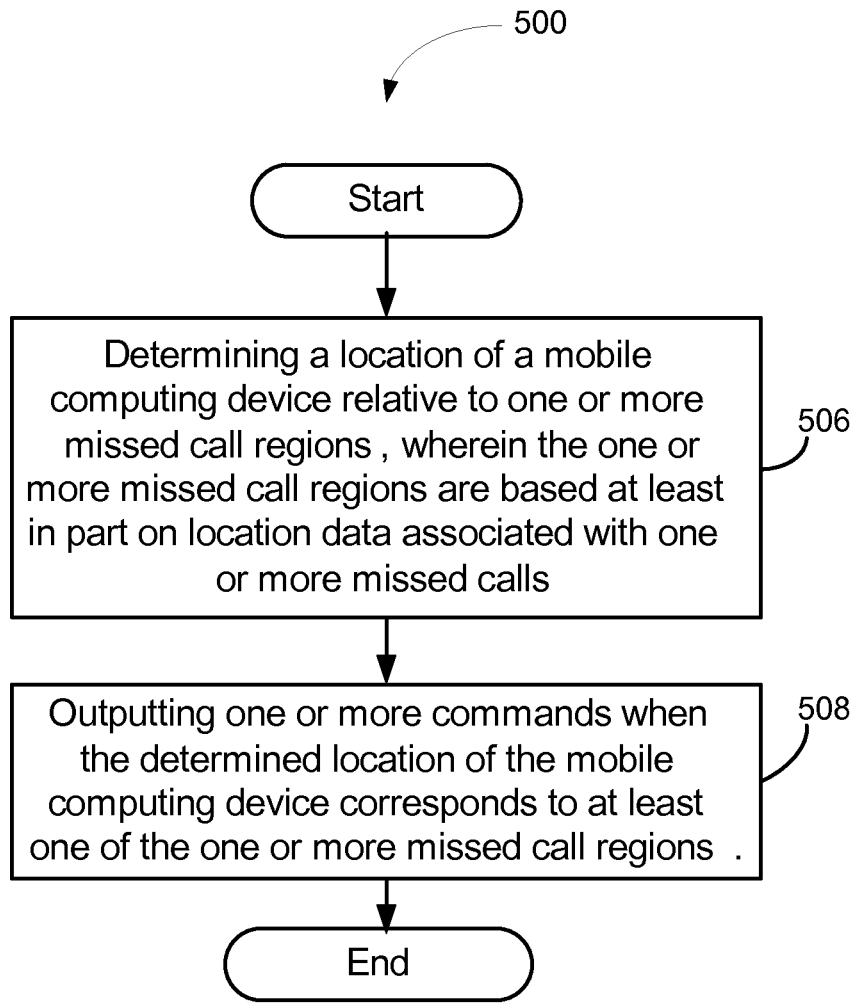
FIG. 5 is a flow diagram of another method according to another implementation.

FIG. 5 is a flow diagram of another method 500 according to an implementation. The method 500 starts in block 502, and according to an implementation includes determining a location of a mobile computing device relative to one or more missed call regions, wherein the one or more missed call regions are based at least in part on location data associated with one or more missed calls. In block 504, the method 500 includes outputting one or more commands when the determined location of the mobile computing device corresponds to at least one of the one or more missed call regions. The method 500 ends after block 504.

According to implementations, certain technical effects can be provided, such as creating certain systems and methods that automatically adjust ringer settings on a mobile computing device. Implementations of the disclosed technology can provide the further technical effects of providing systems and methods that help prevent missed calls.

In implementations of the disclosed technology, the missed-call aggregation system 100, the mobile communications system 200, and/or the server architecture 300 may include any number of hardware and/or software applications that are executed to facilitate any of the operations. In implementations, one or more I/O interfaces may facilitate communication between the missed-call aggregation system 100, the mobile communications system 200, and/or the server architecture 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the missed-call aggregation system 100, the mobile communications system 200, and/or the server architecture 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the missed-call aggregation system 100, the mobile communications system 200, and/or the server architecture 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, implementations of the disclosed technology may include the missed-call aggregation system 100, the mobile communications system 200, and/or the server architecture 300 with more or less of the components illustrated in FIGS. 1-3.

Certain implementations of the disclosed technology are described above with reference to block and flow diagrams of systems and methods and/or computer program products according to implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus define means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile computing devices, generally known as portable computing devices that can run on batteries but are not usually classified as laptops. For example, mobile computing devices can include, but are not limited to portable computers, tablet PCs, Internet tablets, PDAs, ultra mobile PCs (UMPCs), smart watches, and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method comprising:
receiving, by a server, over a mobile communications network, historical missed call data collected at one or more mobile computing devices, the historical missed call data indicating (1) a plurality of incoming calls that arrived at the one or more mobile computing devices but were not answered for a predetermined period of time and (2) location information associated with each of the plurality of incoming calls;
defining, by the server, one or more missed call regions based on an aggregation of the location information indicated by the received historical missed call data;
receiving, from a first mobile computing device of the one or more mobile computing devices, a request for device ringer setting instructions; and
responsive to receiving the request, sending, to the first mobile computing device, based on a current location of the first mobile computing device and the one or more missed call regions defined based on the historical missed call data collected at the one or more mobile computing devices, the requested device ringer setting instructions.

2. The method of claim 1, wherein the request from the first mobile computing device indicates the current location of the first mobile computing device.

3. The method of claim 1, wherein:
the historical missed call data includes one or more of missed call time, current device ringer settings, and subsequent actions.

4. The method of claim 1, wherein the one or more missed call regions are regions in which the one or more mobile computing devices have received more than twice as many missed telephone calls as picked-up calls.

5. The method of claim 1, wherein the ringer settings instructions include instructions for the first mobile computing device to perform one or more of adjusting ringer volume, adjusting vibrator settings, sending a visual notification to a screen, and automatically sending a text message.

6. A computer-implemented method comprising:
receiving, by a server, over a mobile communications network, a report message comprising a set of missed call data collected at one or more mobile computing devices, wherein the missed call data indicates (1) a plurality of detected incoming calls that arrived at the one or more mobile computing devices but were not answered for a predetermined period of time and (2) location information associated with each of the detected incoming calls;
defining, by the server, one or more missed call regions based on an aggregation of the location information indicated by the missed call data that is extracted from the received report message;
determining a location of a first mobile computing device relative to the one or more missed call regions; and outputting, to the first mobile computing device, one or more commands responsive to determining that the location of the first mobile computing device corresponds to at least one of the one or more missed call regions, wherein the one or more commands cause the first mobile computing device to adjust one or more of ringer volume, ringer tone frequency, ringer tone variation, and vibrator settings associated with the first mobile computing device.

7. The method of claim 6, wherein the one or more commands cause the first mobile computing device to present a visual notification at a display screen associated with the first mobile computing device.

8. The method of claim 6, wherein the one or more commands cause the first mobile computing device to send a text message.

9. The method of claim 6, wherein the determining that the location of the first mobile computing device corresponds to at least one of the one or more missed call regions includes detecting that the first mobile computing device has entered a missed call region from the one or more missed call regions.

10. The method of claim 6, wherein the determining that the location of the first mobile computing device corresponds to at least one of the one or more missed call regions includes detecting that the first mobile computing device has exited a missed call region from the one or more missed call regions.

11. A system comprising:
a server comprising a memory storing computer-executable instructions and at least one processor, the at least one processor configured to access the computer-executable instructions stored at the memory, wherein the at least one processor is further configured to execute the computer-executable instructions to cause the system to:
receive, by the server, historical missed call data collected at one or more mobile computing devices, the historical missed call data indicating (1) a plurality of incoming calls that arrived at the one or more mobile computing devices but were not answered for a predetermined period of time and (2) location information associated with each of the plurality of incoming calls;
define one or more missed call regions based on an aggregation of the location information indicated by the received historical missed call data; and
send, to the first mobile computing device, an indication of a subset of the one or more missed call regions, wherein device ringer settings of the first mobile computing device are adjusted based on a determination that a location of the first mobile computing device corresponds to a location within a boundary zone of a missed call region from the subset of the one or more missed call regions.

12. The system of claim 11, wherein the server is further configured send a message to the first mobile computing device responsive to determining that the location of the first mobile computing device corresponds to a location within a boundary zone of the missed call region from the subset of the one or more missed call regions.

13. The system of claim 11, wherein the historical missed call data comprises contextual information including one or more of missed call time, device ringer settings, and subsequent actions.

14. The system of claim 12, wherein the message includes instructions to cause the first mobile computing device to adjust the device ringer settings.

15. The system of claim 11, wherein the one or more missed call regions are regions in which the one or more mobile computing devices have received more than twice as many missed telephone calls as picked-up calls.

16. The system of claim 11, wherein the device ringer settings include one or more of ringer volume, ringer tone frequency, ringer tone variation, and vibrator settings associated with the first mobile computing device.

17. The system of claim 11, wherein the first mobile computing device is caused to output a visual notification to a display screen associated with the first mobile device responsive to the sending of the indication of the subset of the one or more missed call regions.

18. The system of claim 11, wherein the first mobile computing device is caused to send a text message responsive to the sending of the indication of the subset of the one or more missed call regions.

19. The system of claim 11, further comprising detecting that the first mobile computing device has entered a missed call region of the one or more missed call regions.

20. The system of claim 11, further comprising detecting that the first mobile computing device has exited a missed call region of the one or more missed call regions.

* * * * *